United States Patent [19]

Kelsey, Jr.

[11] 4,006,097
[45] Feb. 1, 1977

[54] YB ACTIVATED HAFNIUM OXIDE PHOSPHOR AND METHODS OF MAKING

[75] Inventor: Paul V. Kelsey, Jr., Blacksburg, Va.

[73] Assignee: GTE Sylvania Incorporated, Stamford, Conn.

[22] Filed: May 5, 1975

[21] Appl. No.: 574,275

Related U.S. Application Data

[63] Continuation-in-part of Ser. No. 509,293, Sept. 24, 1974, abandoned.

[52] U.S. Cl. .......................................... 252/301.4 F
[51] Int. Cl.[2] ...................................... C09K 11/46
[58] Field of Search .............. 252/301.4 R, 301.4 F

[56] References Cited

UNITED STATES PATENTS

| | | | |
|---|---|---|---|
| 3,322,682 | 5/1967 | Thompson | 252/301.4 R |
| 3,338,841 | 8/1967 | Brixner | 252/301.4 R |
| 3,449,259 | 6/1969 | Ropp | 252/301.4 R |

FOREIGN PATENTS OR APPLICATIONS

| | | | |
|---|---|---|---|
| 1,208,565 | 10/1970 | United Kingdom | 252/301.4 R |

OTHER PUBLICATIONS

Iwase et al. "Chem. Abstracts" vol. 61, 1964, p. 6545e.
Calgerova et al. "Chem. Abstracts" vol. 79, 1973, p. 59486x.
Kroger "Some Aspects of the Luminescence of Solids", Elseveviar Pub. Co., 1948, p. 298.
Kroger et al. "Chem. Abstracts", 1954, p. 3150b.

*Primary Examiner*—Jack Cooper
*Attorney, Agent, or Firm*—Norman J. O'Malley; William H. McNeill; Robert T. Orner

[57] ABSTRACT

A phosphor composition having the general formula $HfO_2$:Yb with ytterbium being present in an amount of from 0.005 to 0.10 moles per mole of hafnium is disclosed. The phosphor can be prepared from the mixed oxides or from the oxalates, carbonates, or hydroxides by precipitating the latter from an aqueous solution. Firing takes place under a reducing atmosphere, preferably nitrogen, to reduce the ytterbium to the plus 2 ion. The phosphor is a bright green emitter under ultraviolet, x-radiation and cathode ray excitation.

2 Claims, No Drawings

YB ACTIVATED HAFNIUM OXIDE PHOSPHOR AND METHODS OF MAKING

CROSS-REFERENCE TO RELATED APPLICATION

This application is a continuation in part of Ser. No. 509,293 filed Sept. 25, 1974, abandoned and assigned to the assignee of the present invention.

BACKGROUND OF THE INVENTION

This invention relates to synthetic inorganic phosphors. More particularly, the invention relates to compounds of ytterbium activated hafnium oxide which emit light in the green region of the spectrum under excitation with suitable radiation. This radiation includes both long and short wavelength ultraviolet x-radiation and cathode rays.

Phosphors are known products of commerce. Generally, the term is employed in the art to describe luminescent or fluorescent solids which comprise two essential ingredients: a host matrix; and an activator. Such phosphors are employed in color cathode ray tubes, fluorescent lamps, x-ray tubes and both high pressure and low pressure mercury vapor lamps.

It would be an advance in the art to discover new materials which would be useful in the above applications.

OBJECTS AND SUMMARY OF THE INVENTION

Accordingly, it is an object of this invention to provide such a phosphor.

It is a further object of the invention to provide methods for making such phosphors.

These objects are accomplished in one aspect of the invention by the provision of compounds of ytterbium activated hafnium oxide.

DESCRIPTION OF THE PREFERRED EMBODIMENTS

For a better understanding of the present invention, together with other and further objects, advantages and capabilities thereof, reference is made to the following disclosure and appended claims.

Referring now to the invention with greater particularity, therein is herein provided a new, bright green-emitting phosphor having the general formula $HfO_2$:Yb with ytterbium being present in an amount of from 0.005 to 0.10 moles per mole of hafnium. In the preferred embodiment the ytterbium is approximately 0.025 mole per mole of hafnium.

The following no-limiting examples are illustrative of the methods of preparation.

EXAMPLE I

The phosphor can be prepared by forming mixtures of hafnium oxide and ytterbium oxide in proportions to yield 0.005 to 0.10 moles of ytterbium oxide for each mole of hafnium oxide. As noted above, the preferred embodiment employs 0.025 moles Yb/mole Hf. The well mixed oxides are fired in a controlled atmosphere furnace with a nitrogen atmosphere for 6 hours at 1000° C, remortared and fired at 1250° C for 6 hours, also in nitrogen. A controlled atmosphere furnace is one which is closed to the outside air so that the firing atmosphere can be more closely controlled. The resulting phosphor has a green emission under both 2537A and 3650A ultraviolet radiation, x-radiation and under cathode ray bombardment.

During the processing it is believed that the $Yb^{+3}$ is reduced to $Yb^{+2}$; however, it is not known for certain whether this reduction takes place. Also, it is not known what position the $Yb$ occupies in the $HfO_2$ matrix.

EXAMPLE II 20 g $HfOCl_2 \cdot 8H_2O$
0.25 g $Yb_2O_3$
1 ml 70% $HNO_3$
200 ml $H_2O$
7.0 g oxalic acid ($H_2C_2O_4 \cdot 2H_2O$)

An aqueous solution of 20 g $HfOCl_2 \cdot 8H_2O$ and 0.25 $Yb_2O_3$ with 1 ml $HNO_3$ added is heated and stirred constantly at a temperature of 70° C until a clear solution is obtained. The $HNO_3$ is added to solubilize the $Yb_2O_3$; the $HfOCl_2$ being soluble in $H_2O$. Add a precipitating agent such as the aqueous solution of oxalic acid (7 g) which causes a white precipitate to form. Filter the precipitate and dry in an electric oven at about 110° C. To aid in filtering, it is advisable to add approximately 3 g of sodium acetate to the solution before filtering. The dried oxalate is then first fired in a controlled atmosphere furnace with a nitrogen atmosphere at 980° to 1000° C for 2 hours and second fired at 1200° to 1250° C for 2 hours.

EXAMPLE III

The procedure as in Example II except $(NH_4)_2CO_3$ is employed in place of the oxalic acid. The firing time remains the same.

EXAMPLE IV

The procedure as in Example II except $NH_4OH$ is used in place of the oxalic acid. The firing time remains the same.

It will be seen from the above that there is herein provided a new and useful phosphor as well as novel methods of preparing the same.

While there have been shown and described what are at present considered the preferred embodiments of the invention, it will be apparent to those skilled in the art that various changes and modifications may be made herein without departing from the scope of the invention as defined by the appended claims.

What is claimed is:

1. A method of making a phosphor composition having the general formula $HfO_2$:Yb with Yb being present in an amount of from 0.005 to 0.10 moles per mole of hafnium which comprises the steps of: forming a substantially homogeneous mixture of appropriate amounts of the oxides of hafnium and ytterbium to yield the desired formulation; firing said mixture in a controlled atmosphere furnace under a nitrogen atmosphere for about 6 hours at about 1000° C; and mortaring said fired mixture and refiring in a nitrogen atmosphere at about 1250° C for about 6 hours.

2. A method of making a phosphor composition having the general formula $HfO_2$:Yb with Yb being present in an amount of from 0.005 to 0.10 moles per mole of hafnium which comprises the steps of: forming an aqueous solution of appropriate amounts of $HfOCl_2 \cdot 8H_2O$ and $Yb_2O_3$; adding a sufficient amount of $HNO_3$ to said solution to solubilize said $Yb_2O_3$ and heating and stirring constantly at a temperature of about 70° C until a clear solution is obtained; adding a precipitating agent selected from the group consisting of oxalic acid, ammonium carbonate, and ammonium hydroxide to form a precipitate; filtering and drying said precipitate; and first firing said precipitate in a controlled atmosphere furnace with a nitrogen atmosphere at about 980° C to 1000° C for about 2 hours and second firing said precipitate in said furnace at about 1200° C for 2 hours.

* * * * *

UNITED STATES PATENT AND TRADEMARK OFFICE
CERTIFICATE OF CORRECTION

PATENT NO. : 4,006,097
DATED : February 1, 1977
INVENTOR(S) : Paul V. Kelsey, Jr.

It is certified that error appears in the above-identified patent and that said Letters Patent are hereby corrected as shown below:

Column 1, Line 49   DELETE "no-limiting"
INSERT --non-limiting--

Column 2, Line 67   AFTER "1200°C", BEFORE "for 2 hours"
INSERT --to 1250°C--

Signed and Sealed this

Twenty-sixth Day of April 1977

[SEAL]

Attest:

RUTH C. MASON
Attesting Officer

C. MARSHALL DANN
Commissioner of Patents and Trademarks